United States Patent [19]

Dailey

[11] Patent Number: 4,729,364
[45] Date of Patent: Mar. 8, 1988

[54] GRILL WITH VIEW/VENT WINDOW

[75] Inventor: Donald E. Dailey, Evansville, Ind.

[73] Assignee: Preway Industries Inc., Evansville, Ind.

[21] Appl. No.: 50,035

[22] Filed: May 15, 1987

[51] Int. Cl.⁴ ............................................... F24C 3/00
[52] U.S. Cl. ............................... 126/39 R; 126/41 R; 126/200; 99/341
[58] Field of Search ...................... 126/41 R, 19 R, 38, 126/19 A, 25 R, 25 A, 9 R, 9 A, 213, 200, 193; 220/82 R; 99/341, 449, 450; D7/403, 405

[56] References Cited

U.S. PATENT DOCUMENTS

| 18,297 | 9/1857 | Pierce | 126/41 R |
| 941,041 | 11/1909 | Phillips | 220/254 |
| 1,185,856 | 6/1916 | Talbert | 99/341 |
| 3,224,357 | 12/1965 | Rubens | 99/480 |
| 3,556,078 | 1/1971 | McGaughey | 126/25 R |
| 3,611,911 | 10/1971 | Martin | 126/41 R |
| 3,667,648 | 6/1972 | Koziol | 220/82 R |
| 3,791,370 | 2/1974 | Fauser | 126/25 A |
| 4,192,283 | 3/1980 | Kridler | 126/25 R |
| 4,256,080 | 3/1981 | Seach | 126/25 R |
| 4,340,027 | 7/1982 | Fuss | 126/25 R |
| 4,476,849 | 10/1984 | Schmidt | 126/25 R |
| 4,598,693 | 7/1986 | Koziol | 126/41 R |

Primary Examiner—James C. Yeung
Attorney, Agent, or Firm—John C. Cooper, III; Fred Wiviott

[57] ABSTRACT

A grill, such as an outdoor charcoal or gas grill includes a conventional bottom portion having a heat generating source and a rack for supporting a food product above the heat generator. The grill includes a cover which serves to enclose an air space above the rack to permit roasting or baking of food products supported on the rack. The cover also includes an opening and a transparent panel is provided for the opening, preferably by an elongate hinge. The hinge is located at the bottom of the panel and the cover also includes an opening mechanism, whereby the upper portion of the panel may be displaced from the cover to create an opening in the vicinity of the top of the cover. The opening of the panel permits grilling or broiling of the food product, and the user of the grill, by observation of the cooking process occurring in the grill through the transparent panel can open and close the panel by desired amounts and at appropriate times to control cooking operations.

14 Claims, 4 Drawing Figures

GRILL WITH VIEW/VENT WINDOW

BACKGROUND OF THE INVENTION

1. Field of the Invention

The present invention relates generally to the art of grills, especially the type of outdoor grills which are used by their owners for cooking various types of food products. More specifically, the present invention relates to a novel grill cover which includes a transparent panel to allow the cooking operation to be observed by the operator standing next to the grill and which is selectively movable to provide an upper vent in the grill cover to permit control of whatever combination of baking, roasting, grilling and broiling is desired by the chef. Smoke and heat can be precisely controlled using the window structure of the present invention.

2. Description of the Prior Art

Charcoal and gas grills are well known, and many currently available grills include a cover and various vent mechanisms so that food can be either baked or roasted (with the cover on) or grilled or broiled if the cover is removed and the heat is concentrated on one side of the food. Doneness, tenderness, crispness and other such factors are affected by the timing and juxtaposition of the food to the heat source, as well as the smoke pattern created during cooking. Flavor is also affected by the smoke pattern, so maximum control of these factors and the ability to alter cooking conditions would be very desirable to one seeking perfection in the preparation of food. In prior grills, such factors have been controlled, for example, by periodically lifting the lid or cover of the grill, moving the cooking rack, etc., all of which procedures subject the food to ambient conditions, such as outdoor temperature, wind, etc. Such uncontrolled manipulation of cooking conditions disrupts the timing and flavor and leads to lack of predictability.

Several patents known to the present inventor will now be described, it being apparent from the descriptions that scientific and precise control of the cooking process has not been accomplished by any of the prior art devices.

In U.S. Pat. No. 18,297 issued to Pierce on Sept. 29, 1857, a "Domestic Oven" is shown having a vent control on either end of an elongate oven and a door in the front of the oven which is hinged at its top to provide access to the oven interior. There is no indication in the patent that the access door is used to provide any control of the cooking process, nor is there any type of upper vent for the oven.

A "Ventilated Cooking Vessel Cover" is described in U.S. Pat. No. 941,041 issued Nov. 23, 1909 to Phillips. The device is a cover for sauce pans and the like which includes a hinged central venting portion so that food may be cooked in a single cooking vessel in either a covered or uncovered manner. A support is provided for maintaining the venting portion in an elevated position. No method or apparatus is shown in this patent for observing conditions within the vessel and the device is not described as being useful for the types of cooking operations typically conducted in outdoor grills.

Rubens, is his U.S. Pat. No. 3,224,357 issued Dec. 21, 1965 for "Food Smoker Attachment For Hooded Braziers", describes a charcoal type grill which includes an elevated, semi-cylindrical enclosure extending upwardly over approximately one half of the charcoal containing grill body. The cover includes a flap door hinged along the bottom of the enclosure, so that the enclosure may be sealed (except for the bottom) to accomplish a smoking operation on certain food products. A rack for holding the food is located within the cover. The patent also discloses a hinged, planar cover for the other half of the grill body and an arm member which can be attached in several ways to control the amount of air (smoke) entering the tall enclosure.

U.S. Pat. No. 3,556,078 issued to Robert McGaughey on Jan. 19, 1971 for "Barbecue Grill" discloses a conventionally shaped gas grill having a cover which includes a fixed transparent panel in the front generally vertical wall thereof. A top opening is provided which is equipped with a planar weather shield located above and spaced vertically above the top of the cover body. Semi-circular barrier walls which are part of the shield define a plurality of passages into the grill and a rotatable damper projects through the shield to control the size and orientation of the passages. This patent is primarily directed to preventing admission of rain into the grill during inclement weather while allowing some smoke to escape through the top. The weather shield and the viewing panel are separate and distinct elements. The patent does not disclose the material of construction of its viewing panel but indicates that damper adjustments can be made depending on visual observations made therethrough.

A conventional grill equipped with a smoker chamber having a selectively openable top portion is disclosed in U.S. Pat. No. 3,611,911 issued on Oct. 12, 1971 to Martin for "Smoke-Producing Device". The chamber includes a foraminous bottom for supporting a smoke-producing material, such as hickory.

Walter Koziol was granted U.S. Pat. No. 3,667,648 on June 6, 1972 for "Slip Out Glass Panel For Cover Member". An opening is provided in a conventionally shaped gas grill cover at the upper part of the front face and the forward part of the top to receive a transparent panel which covers the opening and allows visual observation of the cooking occurring within the grill. Taken in cross-section from front to back, the panel is generally L-shaped. The patentee discloses that the panel can be removed for cleaning, but no mechanism is shown or suggested for moving the panel during cooking to vary the cooking conditions or flow of smoke from the grill. Various flanges and ledges support the panel in place. With regard to the materials of construction for the transparent panel, the patentee suggests heat resistant glass or plastic materials.

Another food cooking device having a transparent panel is disclosed in U.S. Pat. No. 3,791,370 issued Feb. 12, 1974 to Fauser for "Device For Cooking Food". The device includes a collapsible hood structure with rear and side walls and a plurality of plate members arranged therewith to define an upper outflow opening for fumes. The plate members can be moved to adjust the air draught through the device depending on the food product being cooked. The front panel which is hinged at its top to a fixed member may be constructed of a transparent material so that cooking may be supervised. The transparent panel does not permit adjustment of the top air flow passageway which is built into the device.

An Hibachi with a cover designed to control wind and regulate cooking temperature is disclosed in U.S. Pat. No. 4,256,080 issued March 17, 1981 to Seach for "Cooking Grill With Lid". The cover is mounted to the rear top portion of the grill enclosure and includes ratchet like devices on each end so that the lid can be lowered from a vertical position through a horizontal position.

A kettle type barabecue grill is shown in U.S. Pat. No. 4,340,027 issued July 20, 1982 to Fuss for "Barbecue Grill Cover". The domed cover for the grill which includes a hinged portion (the hinge being near the center top portion of the dome) allows the chef to have access to the cooker interior without removing the entire dome. The cover in the open position acts as a wind shield.

Finally, an "Outdoor Grill Breather" is described in U.S. Pat. No. 4,476,849 issued to Schmidt on Oct. 16, 1984. The conventionally shaped aluminum or cast grill includes a cover and a handle to open same. The distance the cover is raised is controlled by a verticle plate mounted to the cover and having a plurality of holes therein. A spring loaded pin mechanism in the base of the unit is inserted into one of the holes when the desired angle of opening is achieved.

It is apparent from reviewing these patents that it is well appreciated that control of the cooking atmosphere within a grill is important, but that the mechanisms developed to date are relatively complex and still depend in great part on the guesswork, good luck and/or skill of the chef. Furthermore, several of the patents have recognized that observation of the cooking process is desirable, but none of the patents have suggested that it would be appropriate or even feasible to use a viewing panel to provide maximum viewing (i.e., top, front and sides of the meat) of the food and as an integral part of the system for controlling the cooking conditions in the grill. The discovery of such a system by the present inventor constitutes a substantial improvement in the art and a substantial contribution to the effectiveness of grills used by consumers of this type of device.

OBJECTS AND SUMMARY OF THE INVENTION

It is a principal object of the present invention to provide a new and useful cover for grills, such as charcoal or gas grills, which allows observation of the cooking occurring in the grill and a panel which is adjustable to provide for venting of the grill to bypass other vents, creating a chimney effect, and improving the cooking control.

Another object of the present invention is to provide a grill cover which allows observation of the smoke patterns within the cooking enclosure and maximum viewing of the food during cooking.

A further object of the present invention is to provide a grill having a closure for the grill cover which may be opened at or near the top of the cover to create a chimney effect.

A still further object of the present invention is to provide a grill having a cover opening device which is easy to manufacture and to operate.

A different object of the present invention is to provide a grill which can produce desirable results using broiling, grilling, baking, roasting or any combination of the foregoing to provide optimal cooking conditions for a wide variety of food products.

Another object of the present invention is to provide a cover for a grill, the operative principles of which may easily be adapted to a wide variety of grill configurations.

How these and other objects of the invention are accomplished will be described in connection with the following detailed description of the preferred embodiment of the invention taken in conjunction with the FIGURES. Generally, however, they are accomplished by providing a grill with a cover assembly, having end walls, a rear wall and front and top portions which may be variously designed. A portion of the front and top includes a panel of transparent material which is hinged along the lower edge thereof. In its normal position the panel engages an opening in the grill cover so that the grill operates in a basic baking or roasting mode. A device is provided on the cover for engaging the upper portion of the panel and pushing it outwardly from its sealing position to provide a slot or other shaped opening in the cover. When in use in this mode, a chimney effect is created and grilling or broiling of the food product takes place. Other ways in which the objects of the invention are accomplished will become readily apparent to those skilled in the art after the present specification has been read and understood.

DESCRIPTION OF THE DRAWINGS

In the FIGURES, like reference numerals are used to identify like components.

DESCRIPTION OF THE PREFERRED EMBODIMENT

Before proceeding to the description of the preferred embodiment of the present invention, it is important to realize that it is described in connection with a conventional gas grill 10 but that the present invention is equally applicable to grills which use charcoal or other fuels as the heat source. Moreover, the sizes, relative dimensions, gas control devices, handles, rack, burner and other components may be variously embodied without departing from the spirit and scope of the present invention. Accordingly, those components, most of which are very well-known, are described herein in only general terms.

Figure 1:
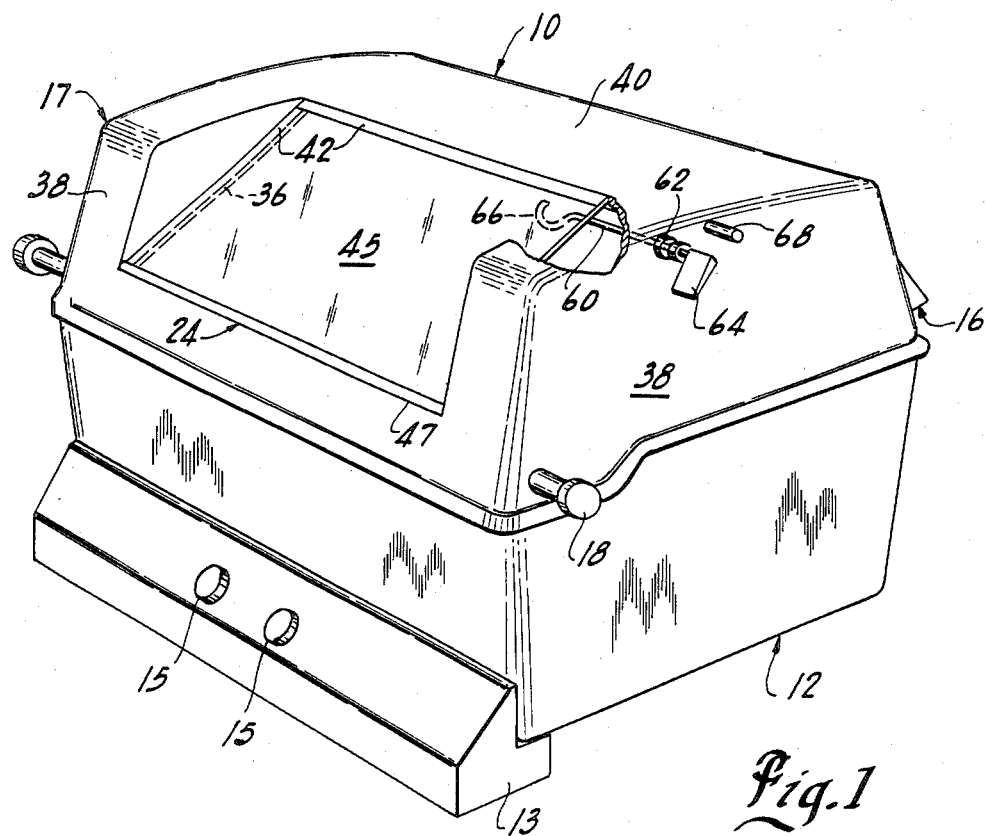
FIG. 1 is a perspective view of a grill and cover assembly according to the preferred embodiment of the present invention, one form of panel opening device being shown in a cut away section of this FIGURE.

In FIG. 1 a grill 10 includes a lower body 12 having mounted to the front lower edge thereof a control device 13 having gas control knobs 14 and 15. This particular grill is of the type which employs an H-shaped burner to be described later, the flow of gas to the right and left sides of which are controlled by knobs 14 and 15. Thereby different foods can be cooked on the right and left sides of the grill under different burner firing conditions or similar foods of different thickness, e.g. steaks, can be cooked so they will be done at the same time using such separate controls. Obviously, only a single control could be used, or if charcoal is used as the fuel, elements 13–15 would be eliminated.

Figure 2:
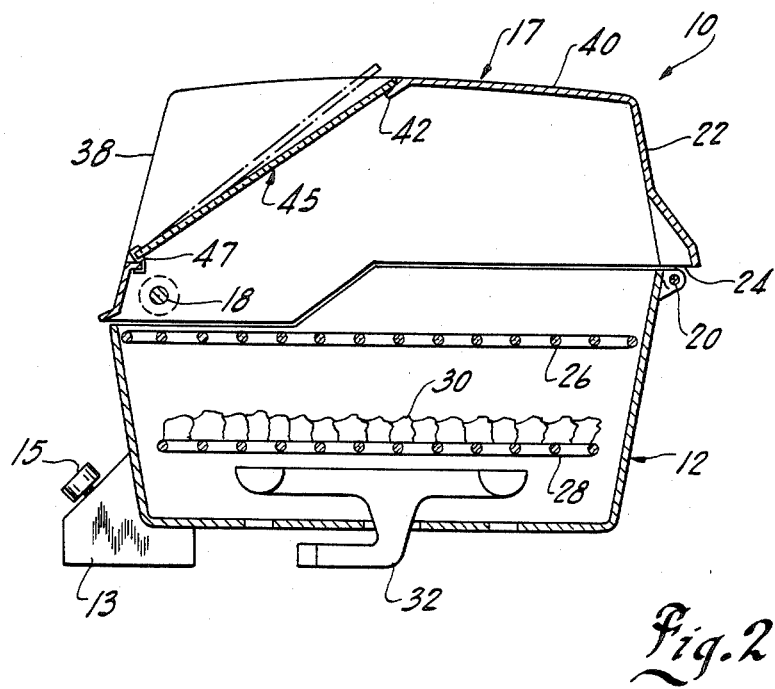
FIG. 2 is a sectional view taken along the line 2—2 of FIG. 1 and showing in full line the movable panel in its closed position for baking or roasting, and in dotted line the panel in its open or grilling position.

Grill 10 also includes a cover 17 having a pair of lifting handles 18 on the front lower portion thereof, cover 17 being hinged to body 12 by a hinge 20 at its lower rear edge (FIG. 2 should also be referred to now in connection with the general description of grill 10). The rear wall 22 of cover 17 is deflected outwardly above hinge 20 to form a vent 24 extending transversely across the back of grill 10. The deflected portion of back 22 also serves as a "stop" when the cover is fully opened.

Located in body 12 are conventional grill elements including a cooking rack 26 (which may be adjustable in height), below which is located a support rack 28 for heat absorbing and radiating material 30 such as volcanic rock or other such materials known to the art. Finally, the H-shaped burner 32 is disposed below rack 28 for generating a gas flame to allow cooking of food products supported by rack 26.

Referring once again to FIG. 1, cover 17 is specially constructed for the present invention by providing a rectangular opening 36 intermediate the side walls 38 of grill 10 and extending from a location above the bottom of the front wall 38 of cover 17 to a location near the top transverse center line of the top 40 of cover 17. Opening 36 is positioned to allow maximum overhead light for viewing and maximum viewing (front, sides and top of the food) during cooking. These features are also enhanced by the angular position and orientation of the panel 45, described below. Opening 36 is surrounded on its sides and top by a ledge 42. Supported across opening 36 is a transparent panel 45 which is affixed to cover 17 by means of an elongate hinge 47 which extends across the front lower edge of opening 36. The panel 45 then rests on ledge 42 and may be lifted away therefrom about the axis of the elongate hinge 47.

Cover 17 may be formed of materials known in the grill art, such as aluminum or steel, and the method of making it is not critical to the present invention. Casting is one manner in which cover 17 may be formed. The hinge 47 may be bolted, welded or otherwise attached to cover 17 and the relative dimensions of the panel and cover may be variously embodied and need not conform to the illustrated relationship. What is necessary is that the panel be rotatable to permit an opening 50 to be created if the top edge of panel 45 is raised away from ledge 42, all as illustrated by the full and broken line positions of panel 45 in FIG. 2. Furthermore, the panel 45 itself may be constructed of glass or plastic materials which are able to be cleaned of smoke and grease and which are able to withstand the temperatures which would be encountered during use of grill 10. While not shown in the FIGURES, it is also within the scope of the present invention to provide for removability of panel 45, e.g. by having hinge 47 include a slot to receive panel 45 and a means for tightening and loosening the slot to permit replacement or removal of panel 45 for cleaning. Panel 45 could also be of a curved (convex or concave) configuration, if desired, for aesthetic purposes.

The final mechanical element of grill 10 to be described is the device for moving panel 45. In FIG. 1, the device is shown as a rod 60 passing through the right side wall 38 of cover 17 and rotatably mounted through a sealed hole 62 near the top of that side wall. The outer end of rod 60 includes a gripping plate eccentrically mounted to rod 60, while the inner end 66 of rod 60 is bent in a semi-circular shape. It is readily apparent that rotation of rod 60 will cause the rounded inner end 66 of rod 60 to push upwardly on the top of panel 45 to displace the panel to the dotted line position in FIG. 2. A stop, such as a protruding plug 68 may be provided on side wall 38 or the mounting of rod 60 through side wall 38 may be made snuggly so that the panel may be raised by any desired amount. The opening device may also be variously embodied.

Figure 3:
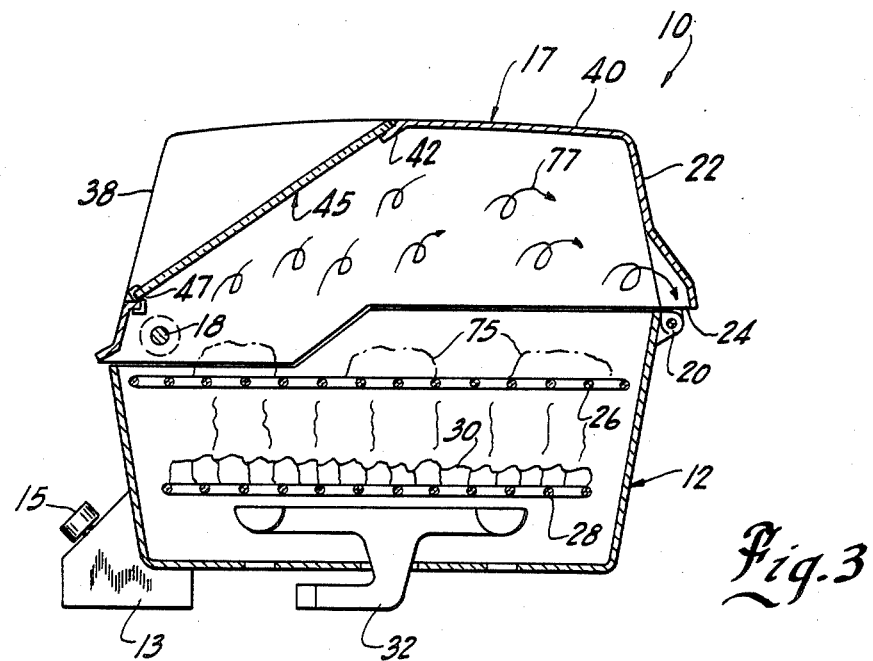
FIG. 3 is a sectional view similar to FIG. 2 illustrating in schematic form the operation of the present invention when the panel is in its closed position.
Figure 4:
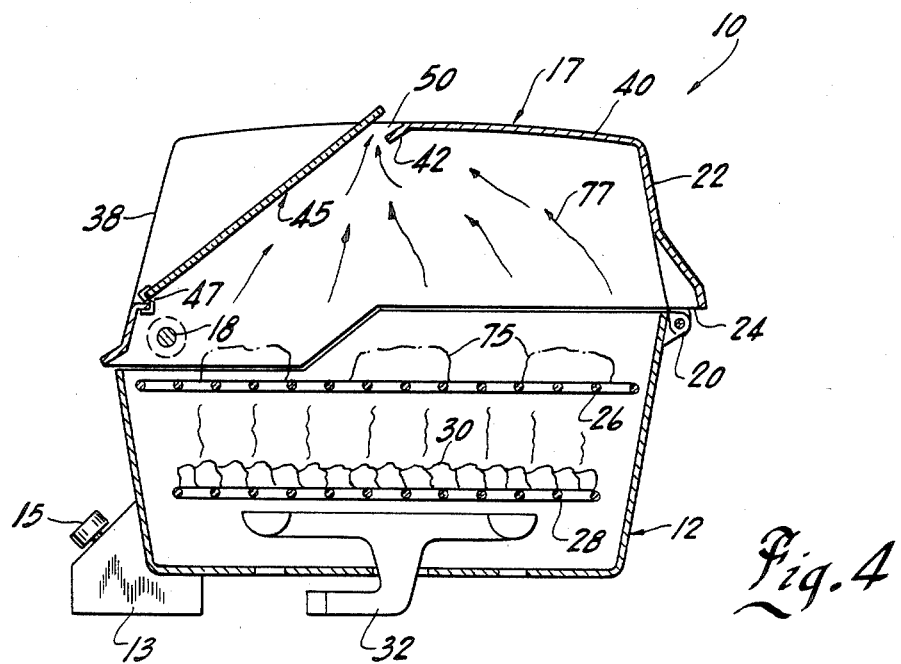
FIG. 4 is a sectional view similar to FIG. 2 and illustrating in schematic form the operation of the present invention when the panel is in its open position.

FIGS. 3 and 4 show in schematic form the operation of grill 10. In FIG. 3 the panel 45 is in its closed position and food products 75 are shown on the rack 26. The product 75 is baking or roasting in this illustration with the smoke 77 shown curling around the food product 75, cooking the food product 75 at a generally even temperature on all sides. The smoke escapes through vent space 24. It should be mentioned that in some grills, bottom vents (not shown) may be provided, especially if the invention is used with charcoal grills which require a flow of air.

The grilling or broiling use of grill 10 is shown in FIG. 4 where the panel 45 has been raised from ledge 42 creating the top slot 50. Here the smoke 77 quickly exits slot 50 due to the chimney effect created within the grill 10 and the heat is concentrated on the lower side of the food product 75.

The choice of when to open the panel 45 and by how much is made by the chef while visually observing the cooking of food product 75. Not only can the product 75 be observed through panel 45, any flame which may be generated (e.g. by dripping fat) can be observed as can the smoke patterns within cover 17. Accordingly, the preparation of food using the principles of the present invention can be dramatically improved. It is also obvious from the foregoing description, that panel 45 can be cleaned using suitable cleaning agents as required. It should also be noted that due to the number of modifications thereto which have previously been described and due to those others which will readily become apparent to those skilled in the art after the present specification has been read and understood, the present invention is not to be limited to the illustrated embodiment but is to be limited solely by the scope of the claims which follow.

What is claimed is:

1. In a grill having a bottom portion for containing a heat generating source, a rim around the top thereof and a support for food products to be cooked by said heat generating source, the improvement comprising:

providing a cover for said bottom portion; sain cover having a top portion and a lower rim adapted to generally engage said rim of said bottom portion;

said cover further including an angularly disposed opening extending from the vicinity of the transverse center line of the top portion of said cover to a location above said lower rim;

transparent panel means adapted to cover said opening and being rotatably coupled to said cover at said location rotating said panel outwardly from said cover in the vicinity of the top portion of said cover.

2. The grill set forth in claim 1 wherein said panel is coupled to said cover by hinge means.

3. The grill set forth in claim 2 wherein said hinge means is located adjacent to but spaced apart from said lower rim.

4. The grill set forth in claim 1 wherein said bottom portion is generally rectangular in horizontal cross-section and wherein said angularly disposed cover opening is generally rectangular and positioned to allow a person standing near said grill to view a maximum amount of space within said grill through said cover opening.

5. The grill set forth in claim 1 wherein said grill further includes means for moving said panel from a first position in which said panel covers said opening to a second position in which the upper portion of said panel means is spaced apart from said cover.

6. The grill set forth in claim 5 wherein said moving means comprises a rod means protruding through said cover, the inner portion of said rod means comprising panel deflector means, and means on the outer end of said rod means for rotating said rod means about its axis.

7. The grill according to claim 1 wherein said heat generating source is a gas burner.

8. A grill comprising:
a lower box-like portion having an open upper end of generally rectangular cross-section and having a generally horizontal rim;
heat generating source means contained within said lower portion;
food support means horizontally located intermediate said heat generating source means and said rim;
an upper box-like cover portion having an open lower end of generally rectangular cross-section and having a generally planar skirt adapted to engage said rim of said lower portion;
means coupling said upper and lower portions together along one adjacent edge thereof, said coupling means permitting opening of said grill;
said upper portion having front and rear walls, side walls and a top;
an angularly disposed opening in said front wall and the forward portion of said top;
transparent panel means and rotatably coupled to said box-like cover portion at said front wall and adapted to seal said opening when in a first position; and
means for selectively rotating the upper portion of said panel means outwardly to create an opening when said panel is in a second position.

9. The grill set forth in claim 8 wherein said panel means is coupled to said upper portion by hinge means.

10. The grill set forth in claim 9 wherein said hinge means is located on the front of said cover portion and spaced above said skirt.

11. The grill set forth in claim 8 wherein said panel means is constructed of a material selected from the group consisting of glass and plastic.

12. The grill set forth in claim 8 further including means for moving said panel from said first position to said second position.

13. The grill set forth in claim 8 wherein said moving means comprises a rod means protruding through one side wall of said upper portion, the inner end of said rod means comprising panel deflector means, and means on the outer end of said rod means for rotating said rod means about its axis 14. The grill according to claim 8 wherein said heat generating source is a gas burner.

* * * * *